(12) United States Patent
Elders et al.

(10) Patent No.: US 9,333,913 B1
(45) Date of Patent: May 10, 2016

(54) REAL TIME VEHICLE SAFETY ALERT SYSTEM

(71) Applicants: Steven D. Elders, Carterville, IL (US); Alex Julian Burke, Herrin, IL (US)

(72) Inventors: Steven D. Elders, Carterville, IL (US); Alex Julian Burke, Herrin, IL (US)

( * ) Notice: Subject to any disclaimer, the term of this patent is extended or adjusted under 35 U.S.C. 154(b) by 0 days.

(21) Appl. No.: 14/846,028

(22) Filed: Sep. 4, 2015

(51) Int. Cl.
 *B60Q 1/00* (2006.01)
 *B60Q 9/00* (2006.01)
 *G08G 1/00* (2006.01)
 *H04H 20/00* (2009.01)

(52) U.S. Cl.
 CPC  *B60Q 9/008* (2013.01); *G08G 1/00* (2013.01); *H04H 20/00* (2013.01)

(58) Field of Classification Search
 CPC .................................. G08G 1/00; H04H 20/00
 See application file for complete search history.

(56) References Cited

U.S. PATENT DOCUMENTS

| | | | |
|---|---|---|---|
| 5,554,982 A | 9/1996 | Shirkey et al. | |
| 5,572,201 A | 11/1996 | Graham et al. | |
| 5,933,093 A | 8/1999 | Austin, II | |
| 6,014,601 A | 1/2000 | Gustafson | |
| 6,417,782 B1 | 7/2002 | Darnall | |
| 6,812,854 B1 | 11/2004 | Edwin et al. | |
| 7,765,228 B2 | 7/2010 | Eichstaedt et al. | |
| 8,258,979 B2 | 9/2012 | Lemmons et al. | |
| 8,581,744 B2 | 11/2013 | Myler | |
| 2005/0037730 A1* | 2/2005 | Montague | B60R 25/1004 455/404.2 |
| 2009/0176457 A1 | 7/2009 | Christensen et al. | |
| 2011/0221611 A1* | 9/2011 | Lemmons | G08G 1/0965 340/902 |
| 2011/0291825 A1 | 12/2011 | Al-Sayegh | |
| 2013/0127638 A1 | 5/2013 | Harrison | |
| 2013/0257631 A1 | 10/2013 | Rangarajan et al. | |
| 2015/0166072 A1* | 6/2015 | Powers | B60W 40/06 701/1 |
| 2015/0310347 A1* | 10/2015 | Mukherji | H04L 67/10 706/51 |

* cited by examiner

*Primary Examiner* — Shirley Lu
(74) *Attorney, Agent, or Firm* — Dale J. Ream (57) ABSTRACT

A real time vehicle safety alert system for monitoring and alerting of hazards proximate a traveling vehicle includes an alert module in data communication with a processor and memory. The alert module may be positioned in a vehicle and in data communication with the vehicle's computer. A global position system is in communication with the processor for determining a current global position associated with the alert module. A receiver is in data communication with the processor and configured to receive alert signals from remote sources. The processor causes the receiver to receive an alert signal and to determine the type of emergency and a global position associated with the received signal. If the alert signal is within a predetermined distance of the position of the alert module, an associated alert message is published to the alert module. If the vehicle computer senses an emergency, a transmitter transmits an alert message.

15 Claims, 11 Drawing Sheets

REAL TIME VEHICLE SAFETY ALERT SYSTEM

BACKGROUND OF THE INVENTION

This invention relates generally to vehicle safety devices and, more particularly, to a safety alert system that alerts a driver of a vehicle regarding real time hazards that are in the near vicinity of the driver's vehicle.

Tragic news stories are heard frequently including traffic accidents involving children being hit by an automobile when walking to or away from a school bus, a car being struck while crossing train tracks unaware of an oncoming train, cars being struck by a snow plow during a snow storm, cars involved in accidents with an ambulance or other emergency vehicle. Many of these tragic accidents could have been avoided if only the drivers of respective automobiles had more advance warning in real time, i.e. at the exact moment they were driving in an area in which a potential hazard is present. For example, a car that gets struck by a train while crossing a set of train tracks could have avoided the accident if the driver of the car had been given advance warning. Similarly, an accident between a car and, say, an ambulance, fire truck, or police car could be avoided if the car had better real time warnings of the close proximity of the emergency vehicle. Still further, a child struck by an automobile after exiting a school bus could have been saved if drivers approaching the loaded bus would have been clearly alerted about a stopping or completely stopped school bus. In addition, occupants of a vehicle could be rescued faster if their vehicle was able to automatically call for help when involved in an accident.

Therefore, it would be desirable to have a vehicle safety alert system for monitoring and alerting of potential hazards proximate a traveling vehicle. Further, it would be desirable to have a vehicle safety alert system that alerts drivers proximate to a hazard in real time, i.e. at the very time the potential hazard is present. Still further, it would be desirable to have a vehicle safety alert system having an alert module configured for installation in private vehicles as well as in vehicles that could be a "potential hazard"—such as a school bus, train, ambulance, etc—so that drivers proximate a hazard may be alerted and the user of the alert module can proactively send alerts. In addition, it would be desirable to have a vehicle safety alert system having an alert module that may be interfaced with a vehicle's on-board computer to send its own alert message if the vehicle is involved in a crash.

SUMMARY OF THE INVENTION

A real time vehicle safety alert system according to the present invention for monitoring and alerting of potential hazards proximate a traveling vehicle includes an alert module in data communication with a processor and memory. The alert module may be positioned in a vehicle and selectively in data communication with the vehicle's computer. A global position system is in communication with the processor and configured to generate a current global position associated with the alert module. A receiver is in data communication with the processor and configured to receive alert signals from remote sources. The system includes programming causing the processor to receive an alert signal and to determine an alert identifier and a global position associated with the received signal. The alert identifier indicates the type of emergency. If the alert signal is within a predetermined distance of the position of the alert module, an associated alert message is published—in text or audio—to the alert module.

A transmitter is in data communication with the processor and the processor is in communication with the vehicle's computer. If the processor detects that the car is involved in an accident, e.g. air bag sensors are deployed, the processor causes the transmitter to automatically transmit an alert signal for the benefit of nearby drivers or to alert nearby emergency services. In addition, a user may input an alert code into the alert module and actuate its transmission—again to alert nearby passengers and emergency authorities of a hazard in the area.

Therefore, a general object of this invention is to provide a real time vehicle safety alert system that monitors and alerts vehicles to emergency conditions that are nearby so that evasive action may be taken or assistance may be timely rendered.

Another object of this invention is to provide a safety alert system, as aforesaid, that delivers alerts to proximate alert modules in real time, i.e. while the potential hazard is imminently present and proximate.

Still another object of this invention is to provide a safety alert system, as aforesaid, in which respective alert modules may transmit alert signals automatically in certain conditions or manually upon active entry by a driver.

Yet another object of this invention is to provide a safety alert system, as aforesaid, that includes a global positioning system associated with each alert module for determining a current global position of a respective alert module for comparison with a current global position of a potential hazard.

A further object of this invention is to provide a safety alert system, as aforesaid, in which an alert module is configured to audibly and textually indicate that an alert has been received and that identifies the specific type of alert.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a rear perspective view of the alert module as in FIG. 2a;

DESCRIPTION OF THE PREFERRED EMBODIMENT

A real time vehicle safety alert system according to the present invention will now be described with reference to FIGS. 1 to 8 of the accompanying drawings. The safety alert system 10 includes an alert module 12 configured for placement in a private automobile, government vehicle, or for use by agencies and organizations for monitoring, transmitting, or receiving emergency alert signals and messages in real time.

Figure 1:
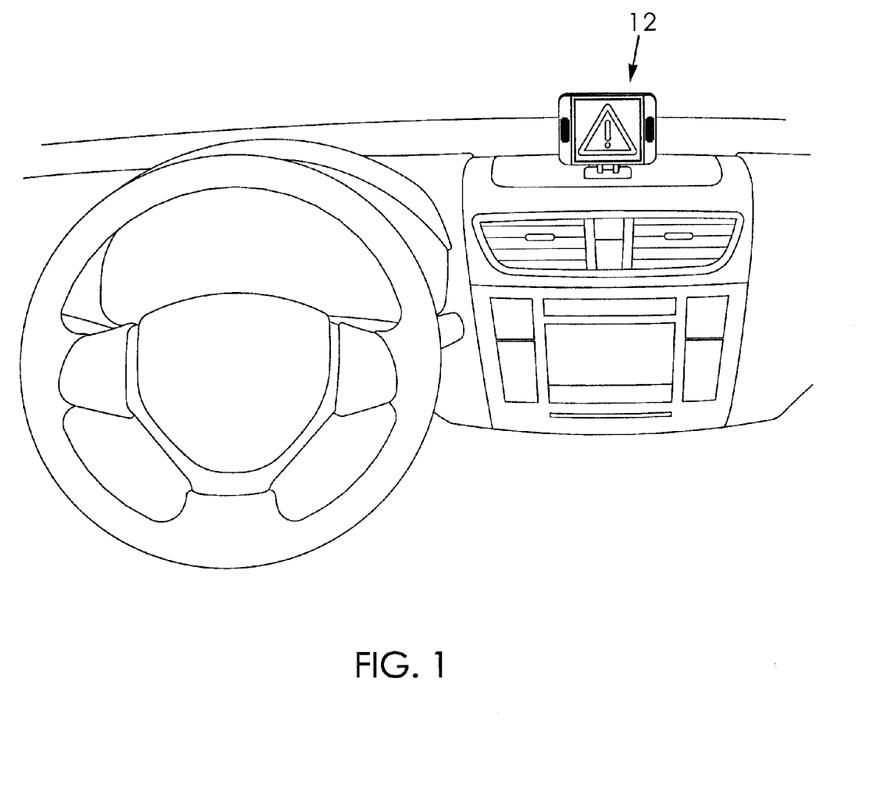
FIG. 1 is a perspective view of a vehicle safety alert system according to a preferred embodiment of the present invention.
Figure 2A:
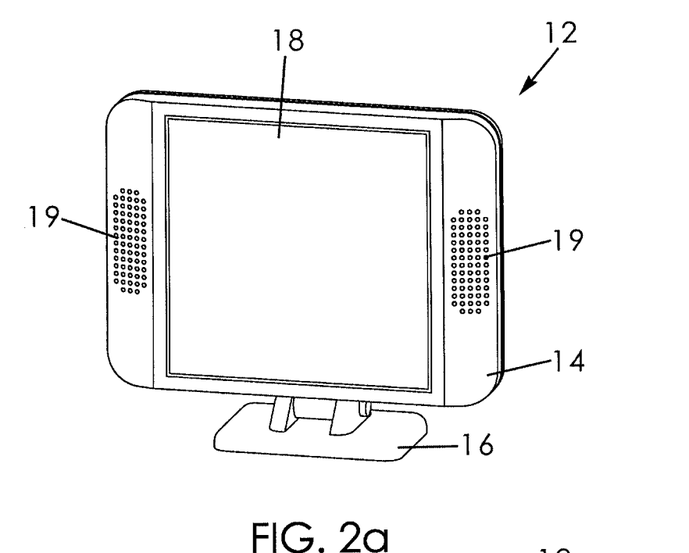
FIG. 2a is a front perspective view of an alert module of the alert system as in FIG. 1.
Figure 2B:
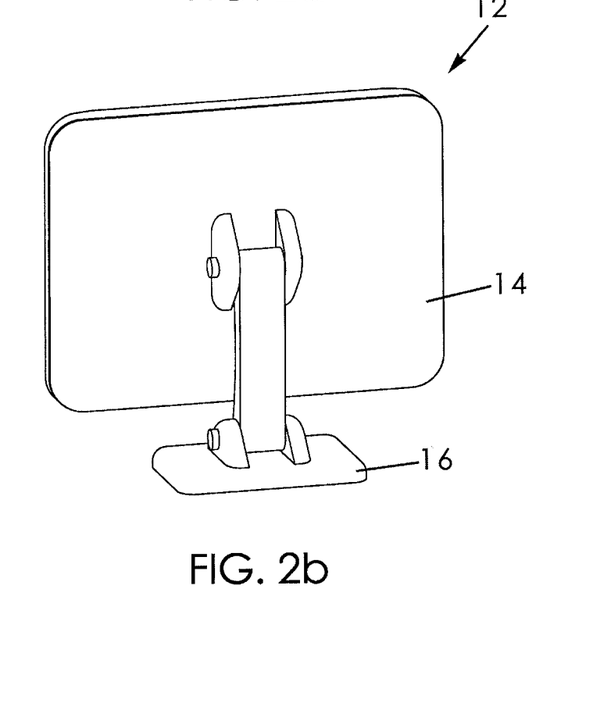
Figure 3A:
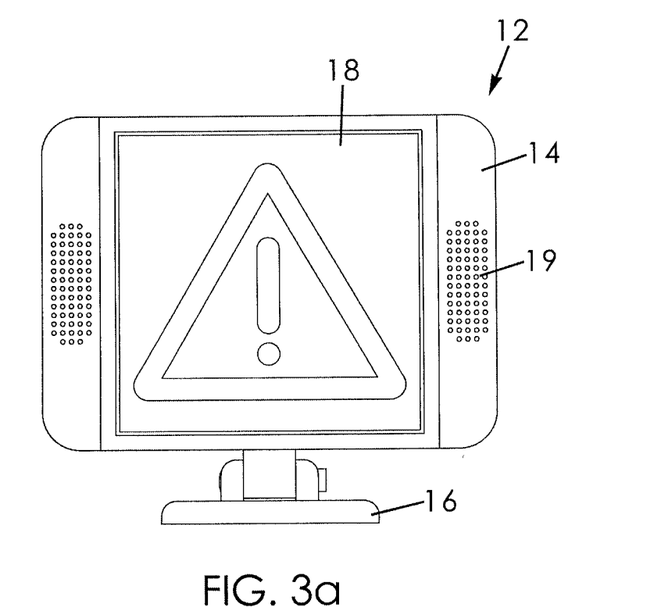
FIGS. 3a to 3h are front views of the alert module illustrating exemplary graphic symbols that can be displayed thereon at the direction a processor.
Figure 3B:
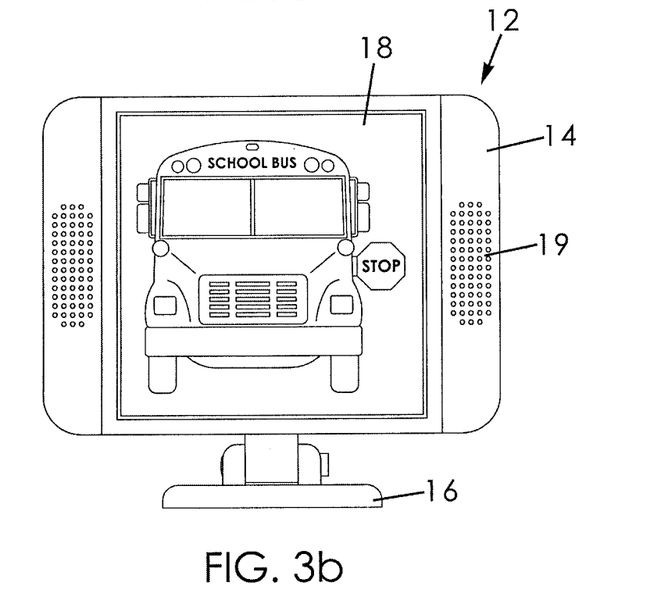
Figure 3C:
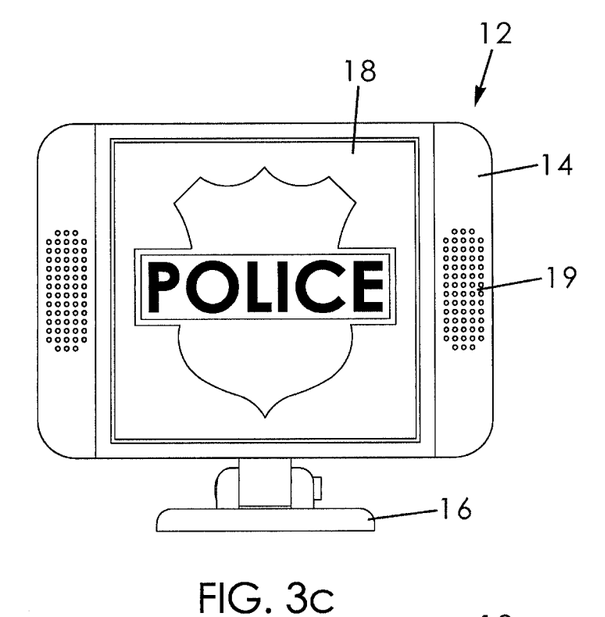
Figure 3D:
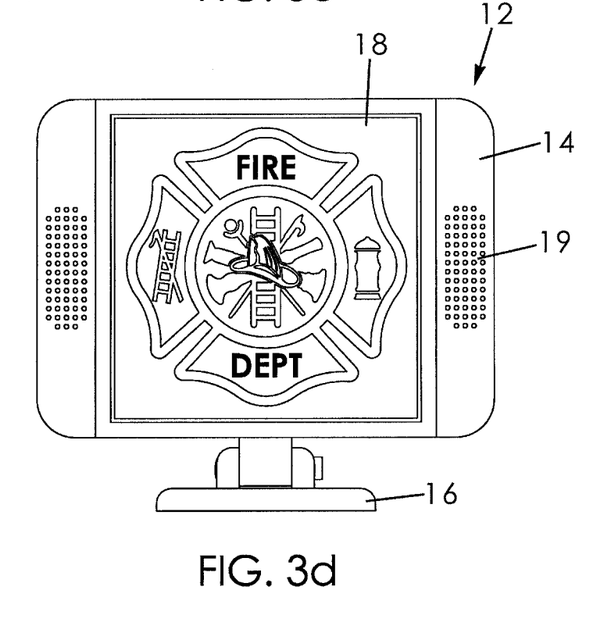
Figure 3E:
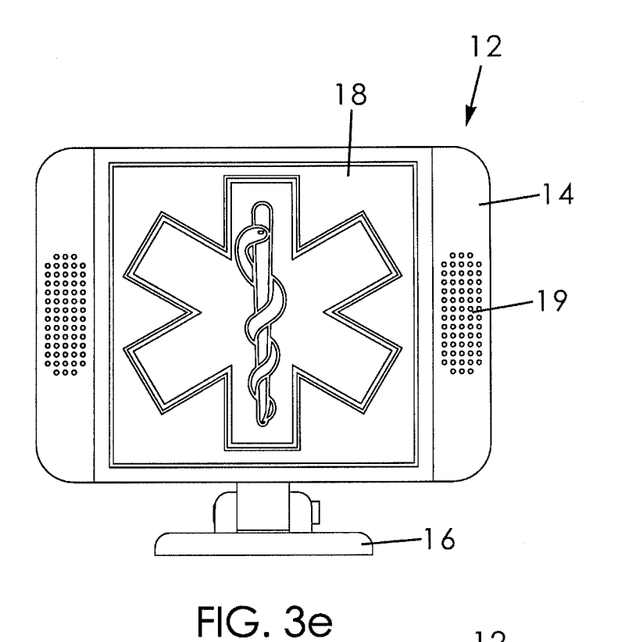
Figure 3F:
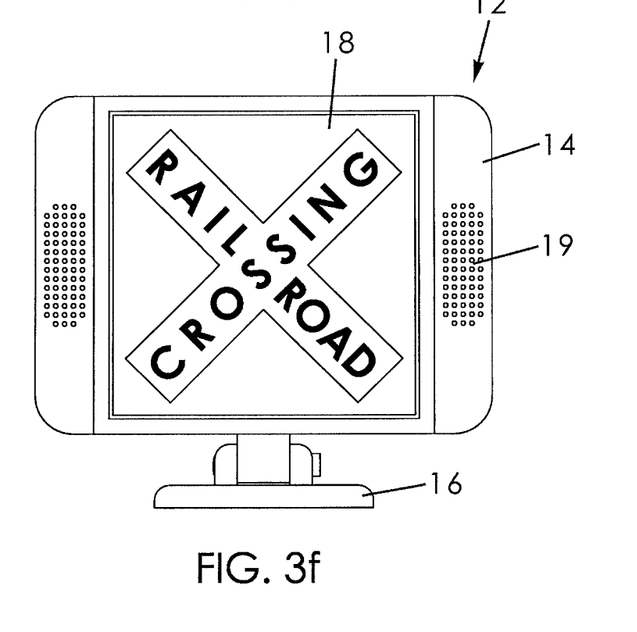
Figure 3G:
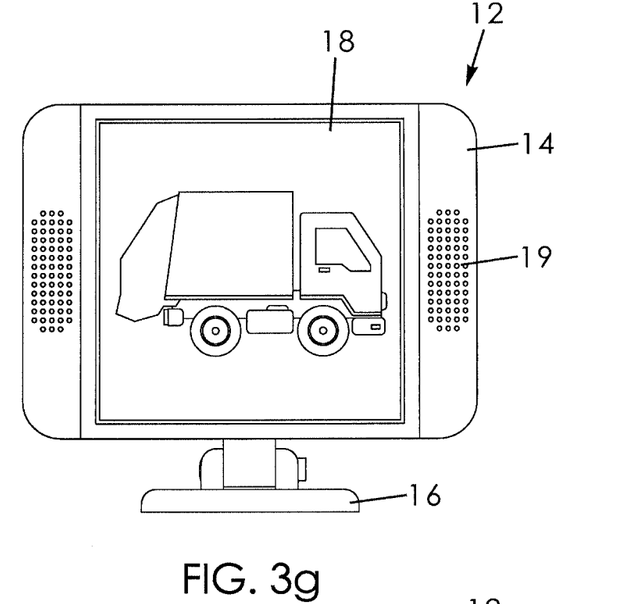
Figure 3H:
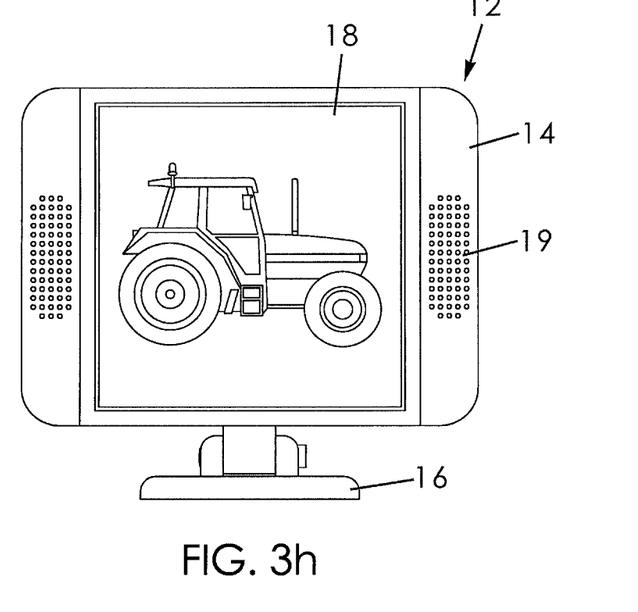

The safety alert system 10 includes a plurality of alert modules 12, each alert module 12 being configured for installation in a private, government, or emergency vehicle. More particularly, each alert module 12 may include a housing 14 having at least, but not limited to, a base 16 and a display 18. In some embodiments, the base 16 may alternatively be mounting hardware coupled to the bottom or rear of the housing 14. In one embodiment, the display 18 may be a touch screen that enables a user to input information as will be described more fully later. Although a plurality of alert modules 12 and related components are provided in an exemplary embodiment, the components of a single alert module 12 will now be described for the sake of clarity. Without limitation, an alert module 12 may be installed in a train, an ambulance, a police car, an emergency dispatch network, a private automobile, a tractor, a weather agency, a railroad crossing, a hospital, or a government agency (e.g. a snow plow vehicle).

Figure 6:
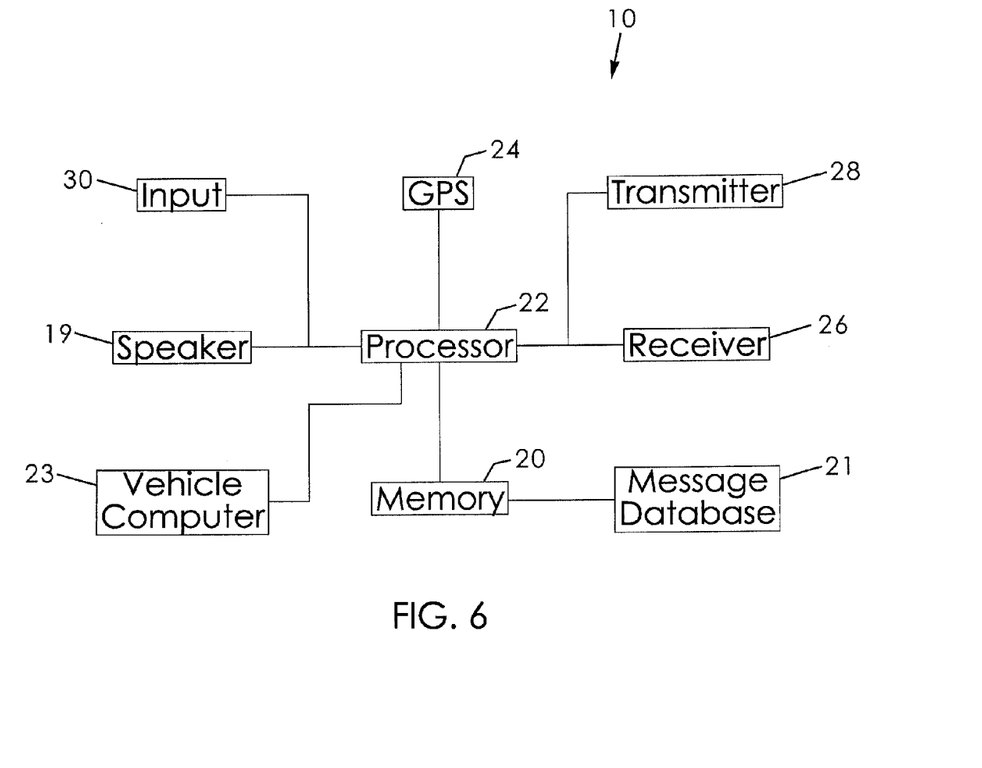
FIG. 6 is a block diagram illustrating the electronic components of the vehicle safety alert system according to the present invention.
Figure 7:
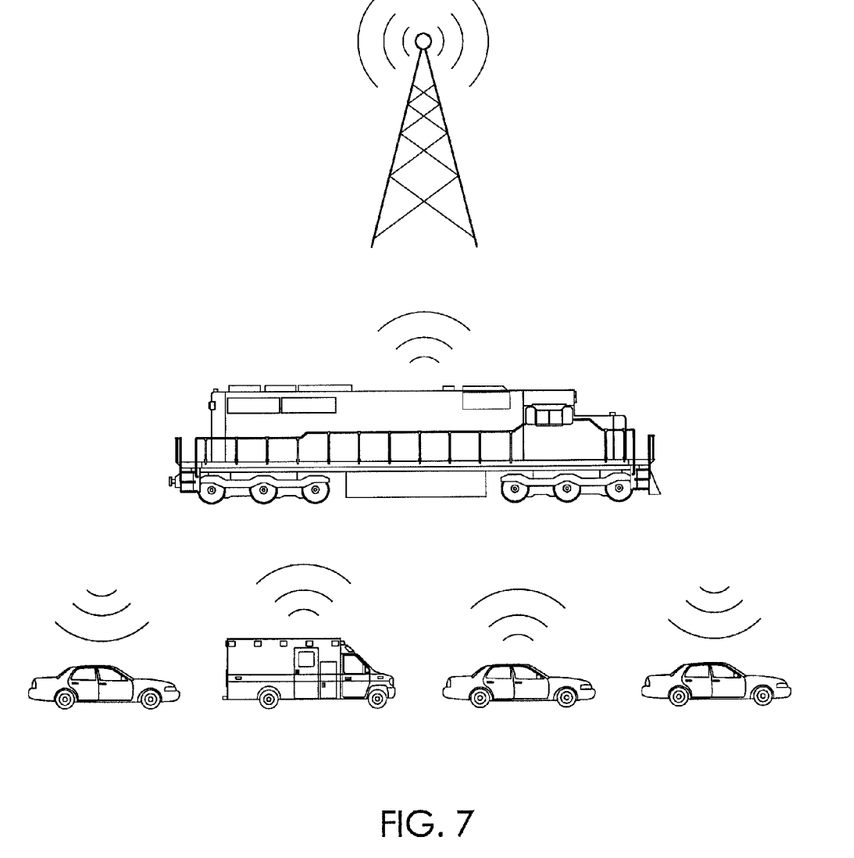
FIG. 7 is a diagrammatic illustration of the vehicle safety alert system according to the present invention.
Figure 8:
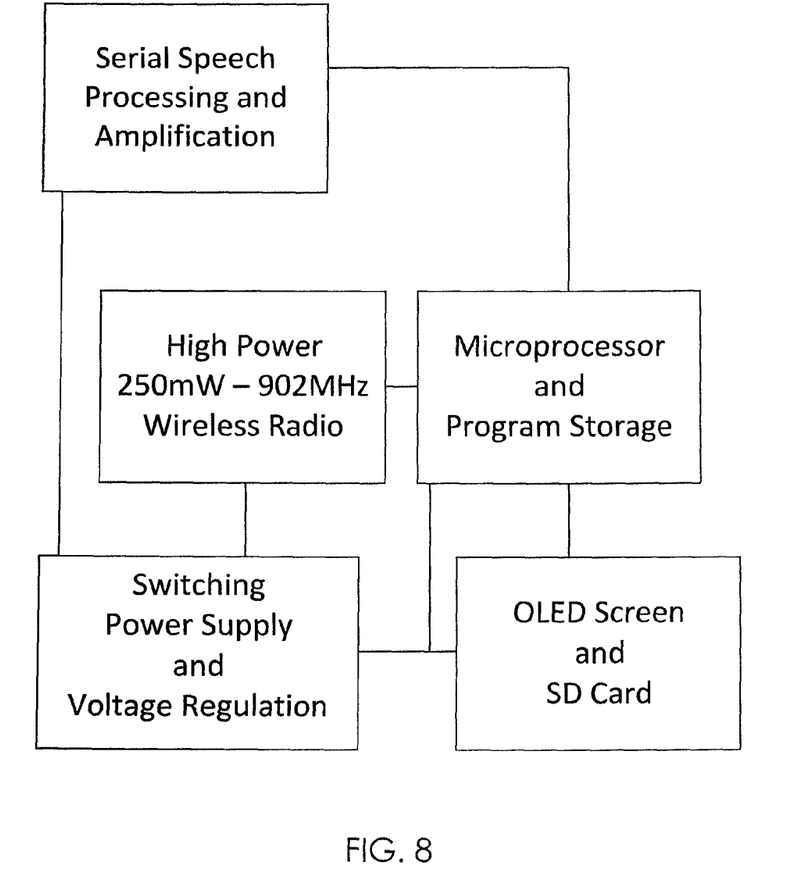
FIG. 8 is a block diagram of implementation specific components of an embodiment of the present invention.

The safety alert system 10 includes a memory 20 positioned in or otherwise in communication with the alert module 12, the memory 20 having a plurality of data structures for storing data and programming as will be further described later. A processor 22 is in data communication with the memory 20 and is configured to execute respective programming steps. Programming in memory 20, when executed by the processor 22, causes the processor 22 to query the GPS to determine a current (real time) global position of the alert module 12.

A global positioning system ("GPS") 24 is in data communication with the processor 22 and memory 20 of each respective alert module 12. The GPS 24 is particularly associated with a respective alert module 12 and is configured to determine a current global position of its associated alert module 12 for use in various comparisons and alert messages as described below.

In an embodiment, a receiver 26 is in data communication with the processor 22 and memory 20 of a respective alert module 12. Preferably, the receiver 26 is positioned in the housing 14 of the alert module 12. It is understood that the receiver 26 may be of a type that receives radio signals, cellular telephone signals, or the like. The receiver 26 is configured to receive an alert signal, such as from a remote alert module 12. For example, an alert module 12 positioned in a train, police car, government agency, or another private vehicle may send an alert signal indicative of a nearby hazard and the transmitted signal may be received by the receiver 26.

Figure 5:
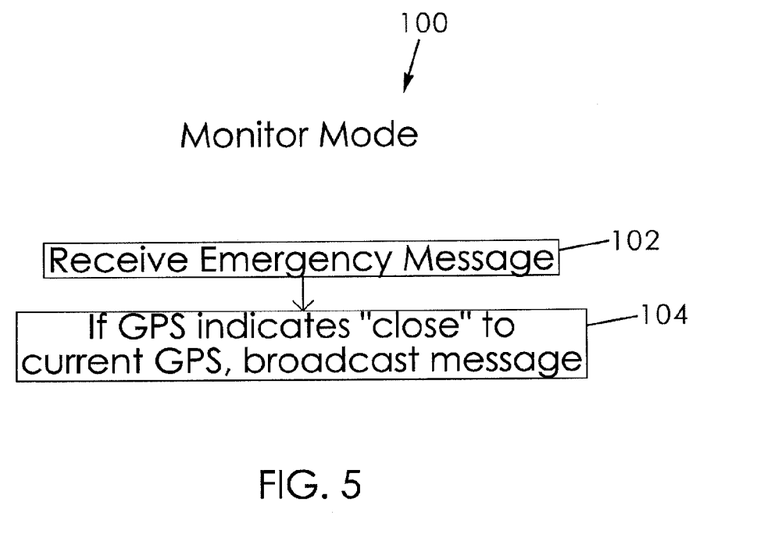
FIG. 5 is a flowchart illustrating the logical steps of a process of a monitoring mode according to the vehicle safety alert system as in FIG. 1.

Programming in the memory 20, when executed by the processor 22, causes the processor 22 to parse a received alert signal so as to determine an alert identifier coded therein. More particularly, the alert identifier may include an alert code indicative that the emergency or hazard is that a train is passing nearby, that a police or fire vehicle is proximate, that a snow plow is nearby, that another vehicle has just been involved in an accident in the vicinity, or the like. Data may be stored in respective data structures in a respective memory for associating the alert identifier of a received alert signal with a respective alert event. The mode of receiving an alert signal described above may be referred to as the "Monitor" mode (FIG. 5).

Further, there is programming in memory 20 that, when executed by the processor 22, causes the processor 22 to determine the global position of the received alert signal. More particularly, the received alert signal includes global position data of the respective alert module 12 that transmitted the alert signal. The processor 22 is then able to compare and determine if the global position embodied in the alert signal is within a predetermined range of a current global position of the alert module 12 having received the alert signal. Transmission of alert signals will be described later.

Still further, there is programming in memory that, when executed by the processor 22, causes the processor 22 to publish a warning message to the alert module 12 if it is determined that the alert signal is within the predetermined range. In some embodiments, the processor 22 may assume that a received alert signal is within the predetermined range because the transmitted signals are only capable of short-range and local delivery. In that case, all received signals will be published as described herein. Specifically, the alert module 12 may include a display 18 configured to display text or graphic data and may include a speaker 19 configured to emit audio data. The alert module 12, therefore, may output a warning message, graphically or audibly, such as "Alert. Driver be alert. There is an emergency in the area." It is understood that the word "emergency" in this example may be replaced with details such as "train," "automobile accident," "police car," or the like. The memory 20 may include a warning message database 16 that associates various alert identifiers with respective messages to be selectively published by the alert module 12.

In one embodiment, the warning message may be embedded in the received alert signal and, as a result, is published directly to the alert module 12. In another embodiment, the alert identifier may be a code that the processor 22 deciphers and uses to determine an associated warning message stored in the warning message database 16 in memory 20. The determined warning message is then published as described above.

Figure 4A:
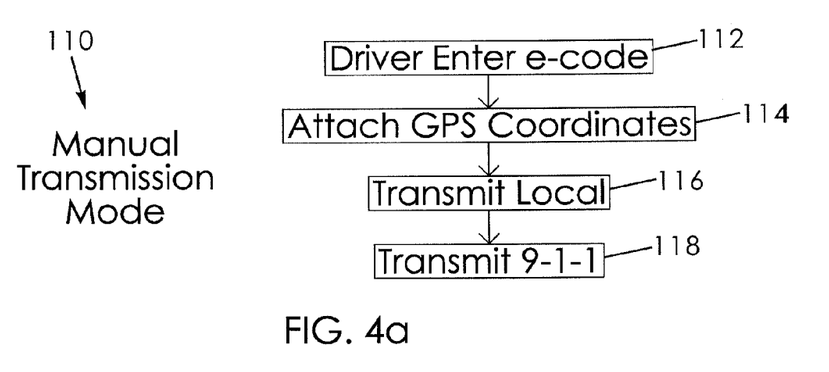
FIG. 4a is a flowchart illustrating the logical steps of a process of manual transmission of a manual transmission of an alert signal according to the vehicle safety alert system as in FIG. 1.

In another aspect, the alert system 10 includes a transmitter 28 associated with each alert module 12. More particularly, a transmitter 28 is in data communication with a respective processor 22 and configured to manually transmit an alert signal in instances that will be described below. In one embodiment, an input device 30 is associated with an alert module 12 and in data communication with the processor 22. Preferably, the display 18 of the alert module 12 is a touch screen that serves as the input device 30. In another embodiment, the input device 30 may be a keyboard, keypad, wireless device, interface with a smart phone, or the like. In any case, the input device 30 is configured to receive data from a user, (e.g. a driver) indicative of an alert identifier. The processor 22, then, is in receipt of the entered alert code. In a touch screen implementation, a user may touch a respective button on the screen, such as "car accident," "snow plow," "ambulance," "fire," etc. Then, the processor 22, executing respective programming steps, causes the transmitter 28 to transmit a new alert signal that includes the entered alert identifier. A current geographic location of the alert module 12 may also be accumulated as a digital packet with the entered alert identifier and, together, the new alert signal is transmitted. This mode may be referred to as a "Manual Transmission" mode" (FIG. 4*a*).

In an embodiment, the new alert signal, including the entered alert identifier and geographic location, may be transmitted to a 9-1-1 emergency telephone network or operator. In this manner, a driver of an automobile can instantly call for emergency assistance, such as if his own car is involved in a crash or if an accident, weather condition, or other emergency is being witnessed in real time.

Similarly, the new alert signal, including the entered alert identifier and geographic location, may be transmitted to one or more predetermined third parties stored in respective data structures in the memory 20. Using the input device 30, e.g. touch screen, a driver may determine which of his saved contacts he may want to alert signal to contact. In this regard, the alert system 10 may include electronics to enable cellular or text communications so as to contact the third party(ies) or authorities.

Figure 4B:
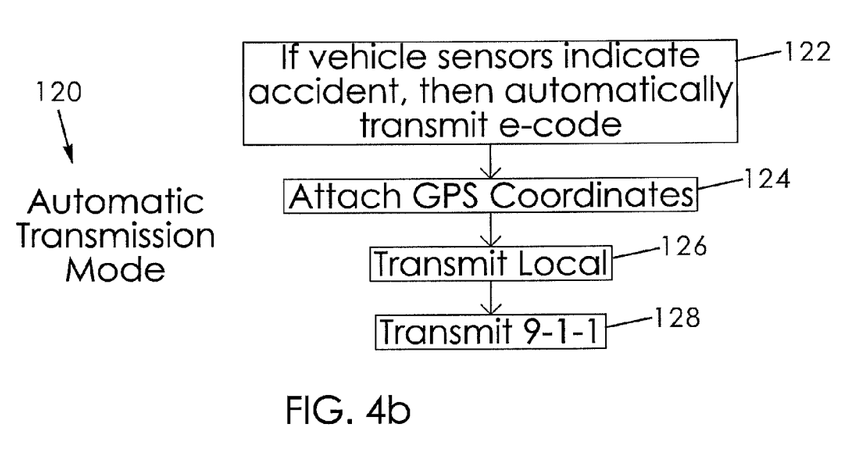
FIG. 4b is a flowchart illustrating the logical steps of a process of automatic transmission of a manual transmission of an alert signal according to the vehicle safety alert system as in FIG. 1.

In another aspect of the invention, the processor 22 associated with a respective alert module 12 may be in data communication with the on-board computer 23 of a vehicle on which the alert module 12 is installed. In this manner, the processor 22 is made aware of certain real time conditions of the vehicle, such as if an air bag has deployed. In one embodiment, one or more additional accident sensors may be deployed about the vehicle that are in data communication with the vehicle computer 23 or directly with the processor 22. For instance, sensors capable of detecting glass breakage, tire deflation, seat belt connectivity, if the car has rolled over, fire, etc. would be useful to determine if and what type of emergency the vehicle is experiencing. The system includes programming that, when executed by the processor 22, causes the transmitter 28 to transmit a new alert signal having an alert identifier indicative of the type of alert along with the most current global position data of the associated alert module 12. This mode may be referred to as the "Automatic Transmission" mode (FIG. 4b).

In use, a respective alert module 12 may be installed in a private vehicle, emergency vehicle, or anywhere that alert messages are to be either transmitted or received. In the monitoring mode 100 (FIG. 5), alert signals transmitted from other alert modules or government entities may be received and analyzed by the processor 22 of a respective alert module 12, as shown in block 102 of FIG. 5. If the received signal is geographically close enough, a warning message associated with the particular alert indicator will be published, textually or audibly, on the display 18 of the alert module 12 so as to warn the driver appropriately, as shown in block 104.

In the transmission mode 110 (FIG. 4a), by contrast, if a driver experiences an alert situation—such as a crash, traffic problem, or other emergency, he may enter an associated code into the alert module 110, as shown at block 112. At block 114, current global position data is added an alert signal having the alert code. At blocks 116 and 118, a new alert signal having the emergency identifier and global position data is transmitted to local contact or to a 9-1-1 network, respectively, for the benefit of nearby drivers or emergency personnel who also have a respective alert module 12.

Finally, in the automatic transmission mode 120 (FIG. 4b), vehicle sensors are monitored to determine if the vehicle has crashed or for other predetermined conditions. If so, a respective alert identifier is determined at block 122. If so, a global position of the alert module 12 is determined at block 124. As shown at blocks 126 and 128, the alert system 10 provides that if a vehicle equipped with an alert module 12 crashes, a transmitter 28 automatically transmits an alert signal and current geographic location to predetermined local contacts or to a 9-1-1 telephone network, respectively.

It is understood that while certain forms of this invention have been illustrated and described, it is not limited thereto except insofar as such limitations are included in the following claims and allowable functional equivalents thereof.

The invention claimed is:

1. A real time vehicle safety alert system for monitoring and alerting of potential hazards proximate a traveling vehicle having a vehicle computer, comprising:
   a memory positioned configured to store data and programming;
   an alert database in said memory having a plurality of warning messages corresponding to predetermined types of alert conditions;
   a processor in data communication with said memory;
   an alert module in data communication with said processor and said memory and positioned in the traveling vehicle;
   a global positioning system ("GPS") in data communication with said processor and configured to generate a current global position associated with said alert module;
   a receiver in data communication with said processor and configured to receive alert signals, each alert signal including an alert identifier indicative of a type of emergency condition and including a global position location associated with said received alert signal;
   programming in said memory that, when executed by said processor, causes said processor to determine from a received alert signal a respective alert identifier and a respective global position location associated with said received alert signal;
   programming in said memory that, when executed by said processor, causes said processor to determine if said global position location associated with said received alert signal is within a predetermined range of said current global position associated with said alert module;
   programming in said memory that, when executed by said processor, causes said processor to publish a respective warning message from said alert database that is associated with said respective alert identifier of said received signal to said alert module if said processor determined said alert event is within said predetermined range.

2. The alert system as in claim 1, wherein said published warning message includes a prerecorded audio message taken from said message database stored in said memory and that is associated with said respective alert identifier taken from said received alert signal.

3. The alert system as in claim 1, wherein said published warning message includes audio data or text data taken from said received alert signal.

4. The alert system as in claim 3, further comprising:
   at least one accident sensor in data communication with the vehicle computer and with said processor that is configured to generate data indicative of an occurrence of an accident; and
   programming in said memory that, when executed by said processor, causes said processor to actuate said transmitter to transmit a respective alert signal that includes said generated data indicative of an occurrence of an accident and said current global position associated with said alert module.

5. The alert system as in claim 1, wherein said alert module includes a speaker configured to play an audio portion of said published warning message.

6. The alert system as in claim 1, comprising:
   a transmitter associated with said alert module in data communication with said processor;

an input device associated with said alert module in data communication with said processor, said input device being configured to receive a user-initiated alert identifier from a user: and programming in said memory that, when executed by said processor, causes said processor to actuate said transmitter to transmit an alert signal including said user-initiated alert identifier and said current global position of said alert module.

7. The alert system as in claim 6, wherein said programming causes said processor to direct said transmitter to transmit an alert signal including said user-initiated alert identifier and said current global position of said alert module code to a 9-1-1 emergency telephone network.

8. The alert system as in claim 6, wherein said programming causes said processor to direct said transmitter to transmit said received user alert identifier to a predetermined third party whose data is stored in said memory.

9. The alert system as in claim 6, further comprising:
at least one accident sensor in data communication with the vehicle computer and with said processor that is configured to generate data indicative of an occurrence of an accident; and programming in said memory that, when executed by said processor, causes said processor to actuate said transmitter to transmit a respective alert signal that includes said generated data indicative of an occurrence of an accident and said current global position associated with said alert module.

10. The alert system as in claim 6, wherein said published warning message includes audio data or text data taken from said message database stored in said memory and that is associated with said alert identifier taken from said received alert signal.

11. The alert system as in claim 6, wherein said published warning message includes audio data or text data taken from said received alert signal.

12. The alert system as in claim 11, wherein said alert module is configured for use with one of a train, an ambulance, a police car, an emergency dispatch network, a private automobile, a tractor, a weather agency, a railroad crossing, a hospital, or a government agency.

13. The alert system as in claim 1, further comprising:
at least one accident sensor in data communication with the vehicle computer and with said processor that is configured to generate data indicative of an occurrence of an accident; and programming in said memory that, when executed by said processor, causes said processor to actuate said transmitter to transmit a respective alert signal that includes said generated data indicative of an occurrence of an accident and said current global position associated with said alert module.

14. The alert system as in claim 1, comprising a plurality a remote transmission units, each remote transmission unit having a remote unit transmitter and a remote unit GPS device.

15. The alert system as in claim 1, wherein said alert module is configured for use with one of a train, an ambulance, a police car, an emergency dispatch network, a private automobile, a tractor, a weather agency, a railroad crossing, a hospital, or a government agency.

* * * * *